United States Patent [19]
Zaleski

[11] Patent Number: 5,359,418
[45] Date of Patent: Oct. 25, 1994

[54] PHOTOMETRIC GRINDER AND LATHE GAUGE

[75] Inventor: Bogdan Zaleski, Columbus, Ohio

[73] Assignee: Omnitech Electronics, Inc., Columbus, Ohio

[21] Appl. No.: 970,039

[22] Filed: Nov. 2, 1992

[51] Int. Cl.⁵ .............................................. A01N 21/86
[52] U.S. Cl. ..................................... 356/387; 250/560
[58] Field of Search ................. 356/386, 387; 250/560

[56] References Cited
U.S. PATENT DOCUMENTS

| | | | |
|---|---|---|---|
| 3,854,052 | 12/1974 | Asar et al. | |
| 4,427,296 | 1/1984 | Demarest et al. | |
| 4,855,608 | 8/1989 | Peterson | 356/386 |
| 4,859,862 | 8/1989 | Planke et al. | 356/387 |

Primary Examiner—Richard A. Rosenberger
Attorney, Agent, or Firm—Frank H. Foster

[57] ABSTRACT

A photometric gauge for measuring the diameters of a workpiece turned about a central axis. The apparatus comprises a light source which scans a light beam across and on either side of a workpiece, to reflect scanned light from a mirror having an approximately elliptical curvature. The light source is located at one focus of the elliptical mirror and a light detector is located at the other focus. Light passing beside the workpiece from the light source focus reflects back to the light detector focus, and the light detector generates an electrical signal. The signal is used by an electronic data processor, along with known geometric parameters, to determine the diameter of the workpiece. A profiler, using the above photometric gauge, takes diameter measurement at regular intervals along the axis of the workpiece, and plots the diameter versus axial position data.

13 Claims, 3 Drawing Sheets

PHOTOMETRIC GRINDER AND LATHE GAUGE

TECHNICAL FIELD

This invention relates broadly to the field of measuring devices for determining a dimension of an object. More specifically the invention relates to the field of gauges using a light beam scanned across a workpiece that has been machined around a central axis to determine the diameter of the workpiece.

BACKGROUND ART

A workpiece turned on a lathe has a central axis about which the piece is rotatably driven. It is important to know the diameters of a workpiece that is being machined on a lathe so that it is certain that the workpiece is within the tolerances required. The distance from the axis of a turned workpiece to its outer circumferential surface is the radius of the workpiece at a specific location along its length. The diameter is two times the radius.

Inexpensive, conventional micrometers and calipers are used to measure the diameter, or diameters if there are multiple ones of interest, along the length of a workpiece. However, since mechanical surface contact is required for micrometers and calipers to work, slight fluctuations in surface texture introduce error in measurement. The operator of the micrometers or calipers must also be experienced with them in order to obtain as accurate and repeatable measurements as are possible with them.

Additionally, the contours of lathe-turned workpieces may make micrometers and calipers impossible to use due to the lack of positive engagement between the contacting surfaces of the micrometers and calipers and the workpiece. For example, if the outer surface of the workpiece is not parallel to the axis of the workpiece, as with a conical structure, the surfaces of the micrometer, which are aligned parallel to the axis of the workpiece, will be impossible to orient parallel to the workpiece surface to obtain an accurate measurement.

A prior art gauge which has replaced the micrometers and calipers for some applications has a base into which the workpiece is mounted after being removed from a lathe or grinder. The gauge has a laser beam which it scans along a fan shaped path across a collimator lens. The scanned beam passes through the collimator lens which directs the beam along a collimated path. Over time, the scanned beam forms a planar, sheet shaped beam. The middle portion of the laser beam "plane" strikes the workpiece with some of the lateral edges of the plane passing on both lateral sides of the workpiece. The light passing laterally by the workpiece strikes a collector lens which is on the opposite side of the workpiece as the collimating lens. The collector lens focuses the laterally passing light onto a detector which is on the opposite side of the workpiece as the collimating lens. The workpiece creates a shadow in the scanned planar beam that interrupts the plane of light directed onto the detector and creates a "shadow". The scanning rate of the laser and the amount of time the shadow is present on the detector are relayed to a computer. The computer uses these data and geometric parameters to calculate the diameter of the workpiece.

The conventional laser device is prone to error in many areas. First, when a workpiece is removed from the chuck of a lathe and is placed in the mount to be measured, it is most likely that the axis on which the workpiece is mounted in the laser gauge will not be aligned with the original axis of the workpiece as defined in the lathe. Since the axis of the workpiece is created on the lathe by holding a cutting tool a selected distance from the axis and cutting material away, the axis of the workpiece would be maintained with certainty by leaving the workpiece in the lathe. This disadvantage of moving the workpiece to a second mount is amplified when the need for further altering the workpiece arises, once measurement has taken place. For example, if the workpiece is in a gauge mount and needs to be further machined, it must be removed from the gauge mount and replaced in the lathe. This introduces the likelihood of further offsetting the workpiece from its axis. The need to position the laser light source, light detector and lenses on opposite sides of the workpiece, and the large size and weight of the conventional laser gauge, make it impractical to mount it on a lathe.

Further error is introduced by the conventional laser gauge by the use of lenses and mirrors in the path of the laser beam prior to the laser beam striking the workpiece. Lenses and mirrors are inherently imperfect, and therefore the gauge can have error in the measured value to at least the extent that the lenses and mirrors have imperfection. These imperfections also limit the maximum measurable diameter of workpieces to about two inches.

In U.S. Pat. No. 4,427,296, Demarest et al. disclose a conventionally used laser gauge which scans a collimated laser beam over an object. The prior art cited by Demarest uses a parabolic lens to collimate the scanned beam into parallel beams passing over the object. The parallel beams are then collected and focused by a second parabolic lens which focuses them onto a detector. Demarest, among other things, substitutes mirrors for the lenses.

The error in the conventional laser gauges using lenses and mirrors, is introduced when the lenses or mirrors are between the beam source and the workpiece. When the beam reflects from a mirror or passes through a lens, the beam takes a path which is altered from its theoretical or ideal path. This is due to imperfections inherent in all lenses and mirrors. The imperfectly directed beam can strike the workpiece when it should pass by and be detected. This leads to the computer calculating a measurement based on a false edge of the workpiece. When these imperfections are introduced in the path of the beam prior to the beam contacting the object being measured, significant error is introduced in the measuring device.

The placement of the second mirror and detector show that Demarest teaches to have active circuitry on opposite sides of the object being measured. If the Demarest gauge were mounted on a lathe, as would be desired, then the active circuitry would need to be on both sides.

In U.S. Pat. No. 3,854,052, Asar et al. disclose a gauge using a laser which is scanned over an object along a fan shaped path. The laser beam is then collimated and then collected by a pair of lenses which focus the light onto a photodetector.

The lenses are on the opposite side of the workpiece as the light source which eliminates the error introduced by having an optical element between the light source and the object being measured. However, by placing the lenses, and more specifically the photodetector and video amplifier circuit, on the side of the workpiece opposite the light source, the disadvantage of making the gauge significantly more fragile exists. If the gauge disclosed by Asar were mounted to a lathe as is most desirable, some fragile elements of the gauge will be on both sides of the object. By placing some sort of active circuitry between the object being measured and a worker, the likelihood of damage to the active circuitry becomes significant. The active circuitry includes the photodetector and video amplifier circuit, and the light source which is a laser and a rocking mirror.

There also exist digitally controlled cutting and grinding machines which have a feedback mechanism controlling and recording the position of a cutting tool. While these machines can control the position of a tool, they normally use a predicted position of the tip of the tool with respect to some coordinate, for example the axis of the workpiece. Since the tools wear due to their mechanical contact with the workpiece, the actual placement of the tool tip varies slightly with use.

There is a need for a gauge that will measure a turned workpiece while it is still mounted in a grinder or a lathe. The term "lathe" is used to refer to lathes, grinders and other similar machines. The gauge should be simple to operate with accuracy, and it should not need multiple calibrations for variations in workpiece diameter. The active circuitry of the gauge should not be between the workpiece and a worker, and should be enclosed to prevent damage.

BRIEF DISCLOSURE OF INVENTION

A photometric gauge is claimed for measuring radial dimensions of a workpiece. The gauge comprises a light source for scanning a beam radially across the workpiece and a significant distance on both sides of the workpiece at a selected angular velocity. The light beam is scanned through only a fluidic medium with no intervening lenses or mirrors between the origin of the scanned beam and the workpiece. The gauge further comprises a mirror having an approximately elliptical curvature and, therefore, two foci. The light source is located at one focus of the mirror and the workpiece is located between the light source and the mirror. The gauge further comprises a light responsive detector circuit that is located at the other focus of the mirror. The detector circuit is for receiving light reflected from the elliptical mirror that has passed by both sides of the workpiece and for generating an electrical signal which is a function of the quantity of received light. The gauge further comprises an electronic data processor connected to the detector circuit for calculating the radial dimension of the workpiece scanned by the beam. The data processor calculates the radial dimension from the angular velocity, the detected time interval during which the scanning beam is interrupted by the workpiece and the positioning dimension of the light source with respect to the workpiece.

Figure 1:
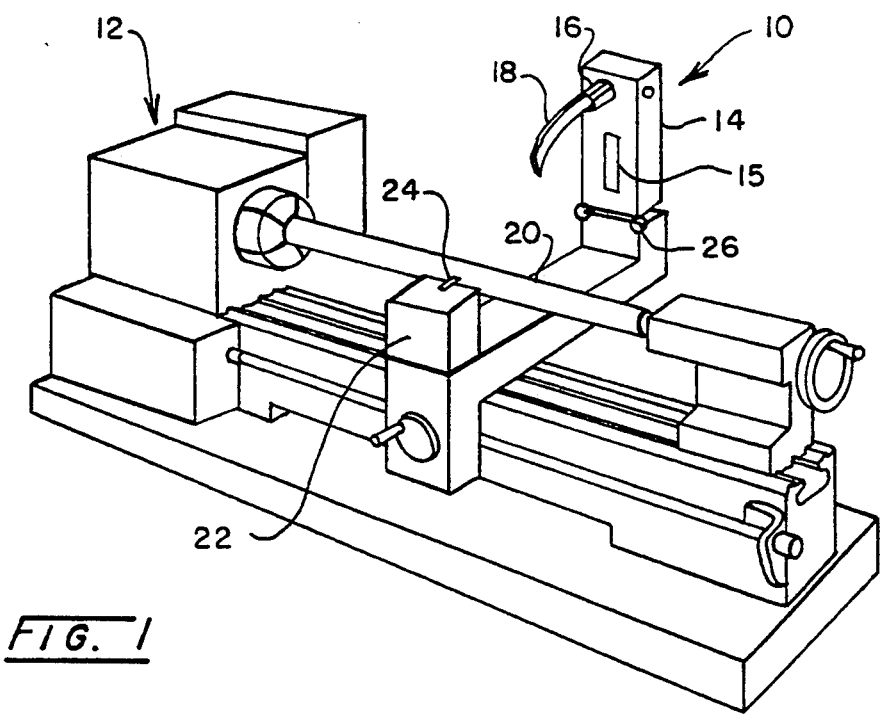
FIG. 1 is a view in perspective illustrating the preferred mounting of the present invention on a lathe.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

FIG. 1 illustrates the preferred location of a photometric gauge 10 in its attachment to a lathe 12. Some of the main elements of the photometric gauge 10 are contained in a box shaped housing 14 and are shown and described in detail in FIG. 2 and the accompanying discussion. A mounting bar 16 extends laterally outwardly from one end of the housing 14 and attaches to an arcuate member 18. A curved mirror is attached to the curved edge of the arcuate member 18 that faces the housing 14.

A workpiece 20 is mounted in the lathe 12 in the conventional manner, and a carriage 22, which holds a cutting tool 24 against the workpiece 20, slides along the axis of the workpiece 20 to remove material as on most conventional lathes. A carriage and guideway that are separate from the lathe 12 could be used, but the carriage 22 is preferred since it maintains constant the distance from the axis of the workpiece 20 to any point on the carriage 22.

A hinge 26 is attached to the end of the housing 14 opposite the mounting bar 16 and the end of the carriage 22 that is behind the workpiece 20, pivotally mounting the housing 14 to the carriage 22. The housing 14 is pivoted about the hinge 26 to lower the photometric gauge 10 into a measuring position from the position shown in FIG. 1. The hinged mounting of the housing 14 to the carriage 22 is not the only possible or useful mount, and the structure and function could vary widely, as long as the photometric gauge 10 can be moved into and out of the measuring position on the workpiece 20. Additionally, while it is preferred to mount the photometric gauge 10 on the carriage 22, it is possible to mount the photometric gauge 10 to, for example, a wall or floor near the lathe 12 so that the photometric gauge 10 can be moved into and out of the measuring position. However, the pivoting of the housing 14 from the carriage 22 allows the distance between the axis of the workpiece 20 and the gauge 10 to be maintained, which is preferred.

The arcuate member 18 is pivoted across the workpiece 20, placing the arcuate member 18 on the side of the workpiece opposite an aperture 15, formed through the housing 14. This results in the workpiece 20 being positioned between the arcuate member 18 and the elements inside of the housing 14. The arcuate member 18 is the only part that is between the workpiece 20 and a worker operating the photometric gauge 10 and lathe 12. No active circuitry is placed in a position where it could easily be damaged, only the passive mirror is placed between the workpiece and a worker.

Normally, the workpiece 20 is not measured and machined simultaneously. Therefore, the photometric gauge 10 is pivoted up into the position shown in FIG. 1 when the lathe 12 is in operation, and then pivoted downwardly into the measuring position.

Using the preferred embodiment of the present invention, a workpiece 20 having a diameter of up to four inches can be measured. In addition, the photometric gauge 10 has the capability to be switched from English to metric units. The overall volume and weight of the present invention are approximately half those of all conventional laser gauges.

Figure 2:
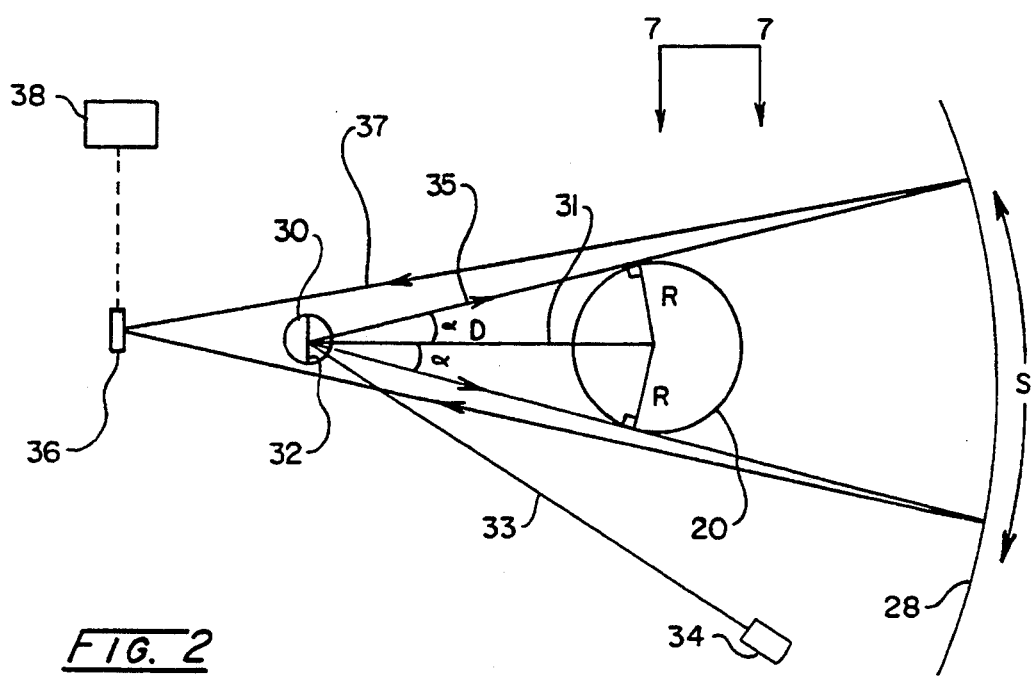
FIG. 2 is a schematic side view illustrating the preferred embodiment of the present invention.

The contents of the housing 14 and other pertinent elements from FIG. 1 are illustrated schematically in FIG. 2. In FIG. 2, the parts of the photometric gauge 10 are shown in the preferred measuring position which is when the arcuate member 18 is on the side of the workpiece 20 opposite the aperture 15. The housing 14, workpiece 20 and arcuate member 18 are contained in a fluidic medium. A fluidic medium includes gases, liquids, and also vacuum, but atmospheric air is the preferred medium.

A curved mirror 28, having an approximately elliptical curvature, is on one side of the workpiece 20, mounted to arcuate member 18 of FIG. 1. The mirror 28 has a circular curvature which, for light incident upon it at low angles with respect to its axis, approximates the curvature of the same region of an ellipse. Since the angles with respect to the axis of the mirror 28 are very small, the circular curvature provides a very good elliptical approximation. Mirror 28 has a first focus at one distance from it, and a second focus at a second distance from it. The farther the foci are placed with respect to each other, the lower the angle (with respect to the axis of the mirror 28) can be to still closely approximate an ellipse.

A given ellipse has a specific pair of focal points that define the ellipse. An elliptical mirror, which is a portion of an ellipse, has the same two focal points as the entire ellipse. This means light emanating from one focus will reflect off of the mirror and pass through the second focus. In the present invention, the workpiece 20 is between the mirror 28 and the focus nearest to the mirror 28.

A rotatingly driven shaft 30, preferably the shaft of an electric motor, has its axis at one focus of the elliptical mirror 28. The focus is preferably one of the foci defining the ellipse. The rotating shaft 30 is on the opposite side of the workpiece 20 as the elliptical mirror 28. A planar mirror 32 is attached parallel to and along the axis of the rotatingly driven shaft 30. A small diameter laser beam 33 is directed onto the planar mirror 32, from a conventional laser 34. The planar mirror 32 having the laser beam 33 reflecting from it comprises a light source.

The planar mirror 32 reflects the laser beam 33 during a portion of the rotation of the rotatingly driven shaft 30. The rotating planar mirror 32 directs a reflected laser beam 35 across the workpiece 20 and a significant distance on both sides of the workpiece 20, at a time changing angle with respect to the incident laser beam 33. The angular velocity of the scanning laser beam 35 is equal to the angular velocity of the rotatingly driven shaft 30.

As the laser beam 35 changes direction with time, it scans through a fan shaped path that includes the workpiece 20 and a significant region of space on both sides of the workpiece 20. The portion of the laser beam 35 that scans through the fan shaped path, and passes by the workpiece 20, is reflected from the elliptical mirror 28 to a photodetector 36, located at the second focus of the elliptical mirror 28. The detector 36 is part of a detector circuit and is located at the focus that is farther from the mirror 28 than the focus of the rotating shaft 30. The detector 36 is a conventional photodetector which, upon receiving energy in the form of electromagnetic radiation, emits an electrical signal that is a function of the quantity of received energy.

The portion of the beam 35 following the fan shaped path that strikes the workpiece 20 is diffusely reflected away in random directions. This absence of some of the light creates a "shadow" in the beam 35 that reaches the elliptical mirror 28, and subsequently, the detector 36.

An electronic data processor which is preferably a computer 38, is connected to the detector 36 for calculating the radius and subsequently, the diameter, of the workpiece 20. The computer 38 calculates the radius from the angular velocity of the planar mirror 32, the detected time interval during which the scanning laser beam 33 is interrupted by the workpiece 20 and the positioning dimension of the planar mirror 32 with respect to the workpiece 20 by the application of well known principles of geometry and trigonometry.

Figure 7:
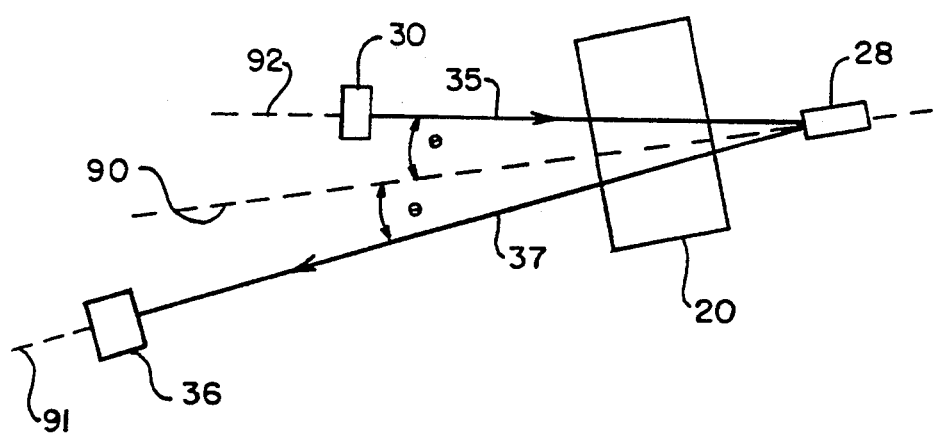
FIG. 7 is a top schematic view of the embodiment shown in FIG. 2 illustrating the offset positioning of the detector and light source.

The detector 36 and the planar mirror 32 are preferably not intersected by a plane 90 shown in FIG. 7. The plane 90 intersects the elliptical mirror 28 normal to the entire surface of the mirror 28. The detector 36 and the planar mirror 32 are offset on opposite sides of the plane 90. The laser beam 35 which is reflected from the planar mirror 32 in a fan shaped path, and is incident upon the elliptical mirror 28, intersects the plane 90 at the elliptical mirror 28. The laser beam 35 then reflects as laser beam 37 in a fan shaped path, but with a workpiece 20 sized hole in the fan. Plane 91, containing the scanning path of the laser beam 37, is at an angle Θ to the plane 90. This angle Θ is equal to the angle plane 92 containing the incident laser beam 35 forms with the plane 90. The offsetting of the detector 36 and the planar mirror 32 from the plane 90 prevents mechanical interference between the incident and reflected laser beams 35 and 37 and the offset mechanical parts. While it is possible to not offset the parts, it is preferred that they be offset.

If a mirror having an approximately elliptical curvature is used, as in the preferred embodiment of the present invention, a light source and photosensitive detector can be located within the plane that intersects the elliptical mirror normal to the entire surface of the mirror. However, due to possible blockage of the reflected light by the light source, such a photometric gauge containing the elements could not measure workpieces having diameters much smaller than the size of the light source.

Additionally, if a mirror having a circular curvature was used, a light source and a photosensing detector could be positioned identically to any situation with an elliptical mirror, with one exception. If the light source is located at the center of curvature of the circular mirror, then all of the light reflected from the circular mirror would reflect back to the light source. In this situation, the detector could not be physically located at the identical point in space as the light source to receive the reflected light. However, the light source and detector could be located at the center of curvature of the circular mirror, but they would have to be offset from a plane intersecting the circular mirror normal to its entire surface due to imminent mechanical interference.

The size of the energy detecting surface of the detector 36 is preferably two to four times larger in area than the cross-sectional area of the laser beam 34 to make up for imperfections in the reflections from the mirror 28. By being fairly small, the detector 36 has a fast response time due to its small capacitance compared to larger detectors. Additionally, the small detector 36 is less expensive and gives more accurate electrical signals.

The present invention operates in the following manner as illustrated in the embodiments shown in FIG. 1 and FIG. 2. The photometric gauge 10 is lowered into the measuring position, in which the arcuate member 18 is positioned on the side of the workpiece 20 opposite the aperture 15. The laser 34 directs a laser beam 33 onto the planar mirror 32 which is rotating at a selected angular velocity. The laser beam 35 is reflected at an angle which changes with time, causing the laser beam 35 to scan through a fan shaped path that begins a significant distance from one side of the workpiece 20 and ends on the opposite side of the workpiece 20, a significant distance from it.

Figure 3:
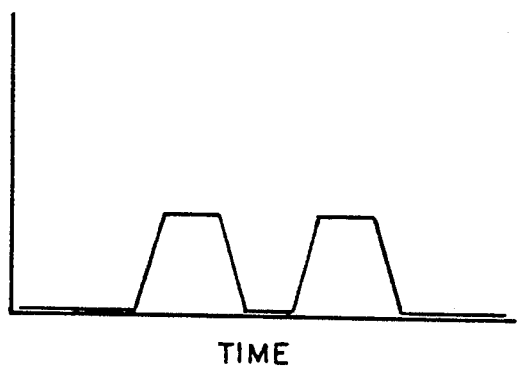
FIG. 3 is a graph of time versus intensity illustrating an electrical signal generated by an element of the present invention.

The portion of the scanning laser beam 35 that passes by both sides of the workpiece 20 is reflected from the elliptical mirror 28 onto the detector 36, generating an electrical signal that comprises two pulses shown in FIG. 3.

The initial pulse begins when the laser beam 37 begins to be reflected onto the detector 36 by the elliptical mirror 28. This occurs when the laser beam 35, as it scans downward in FIG. 2, begins to reflect from the top edge of the elliptical mirror 28. The end of the first pulse occurs when the scanning laser beam 35 impinges upon the top edge of the workpiece 20 as shown in FIG. 2.

The second pulse begins when the scanning laser beam 35, as it scans downward in FIG. 2, reaches the lower edge of the workpiece 20 and again begins to be reflected from the elliptical mirror 28. The second pulse ends when the laser beam 35 stops being reflected from the elliptical mirror 28, preferably when the scanning beam 35 is about the same distance from the outer edge of the workpiece 20 that it was when the initial pulse began. The shaft 30 continues in its rotation to place the planar mirror 32 in position to begin reflecting the laser beam 35 again.

The pulses created by a theoretical laser beam having an infinitesimal diameter would produce a pair of spaced, perfectly rectangular pulses having vertical sides and horizontal tops. However, since the laser 34 used in the present invention has a diameter of approximately one half of a millimeter, some deviation from the perfect pulses occurs. The results are slightly inclined edges on the pulses, making it difficult to discern exactly when the pulses begin and end. The way this is dealt with by the computer 38 is that it approximates a starting and finishing place for each pulse by dividing the inclined sides of the pulse in half and taking the halfway points as the beginning and ending points. Of course, the computer 38 could approximate the beginning and ending points anywhere along the inclined edges.

The departure from the theoretical shape of the pulses arises from the finite diameter of the laser beam 37 which results in gradations in the amount of light received by the detector 36. The pulses are inclined at the beginning and ending edges because the outer edges of the finite diameter laser beam 37 are detected by the detector 36 before and after the center, full intensity of the laser beam 37 is received by the detector 36. The full intensity is evident when the pulses are at their peak values.

The time between the ending of the first pulse and the beginning of the second pulse is a measurable quantity which indicates the angular distance the rotating shaft 30 displaces in scanning over the workpiece 20. This value is used by the computer 38, and is discussed below.

As illustrated in FIG. 2, the length of line 31 extending between the axis of the rotating shaft 30 and the axis of the workpiece 20 is denoted by D. The line 31 and a second line 35, extending from the axis of the rotating shaft 30 tangentially to the outer surface of the workpiece 20, have an angle between them that is denoted by $\alpha$. The distance D is a known quantity, known by intentionally setting this dimension at the set up of the photometric gauge 10. In the preferred embodiment, the distance D is constant. D is preferably the distance between the axis of the workpiece 20 which is fixed in a lathe 12, and the axis of the rotating shaft 30, which is constant when the photometric gauge 10 is in its measuring position.

Geometry reveals that a radius R of the workpiece 20 is determined from:

$$R = D \sin\alpha. \qquad \text{(equation A)}$$

An angle $2\alpha$ is determined by multiplying the amount of time between the pulses (shown in FIG. 3) by the angular velocity (number of degrees per unit of time) of the rotating shaft 30. The product of this equals the number of degrees the rotating shaft 30 rotates through, equal to $2\alpha$, to cast the "shadow" created by the workpiece 20.

The computer 38 shown connected to the detector 36 in FIG. 2 calculates the radius, R from the known distance D and the calculated angle $\alpha$ (which is half of $2\alpha$) using equation A. The diameter of the workpiece is calculated by multiplying the radius, R by 2.

It is possible to move the axis of the workpiece 20 toward or away from the rotating shaft 30 or vice versa. However, the distance D, while variable, must be known in order to calculate the radius of the workpiece 20.

Figure 4:
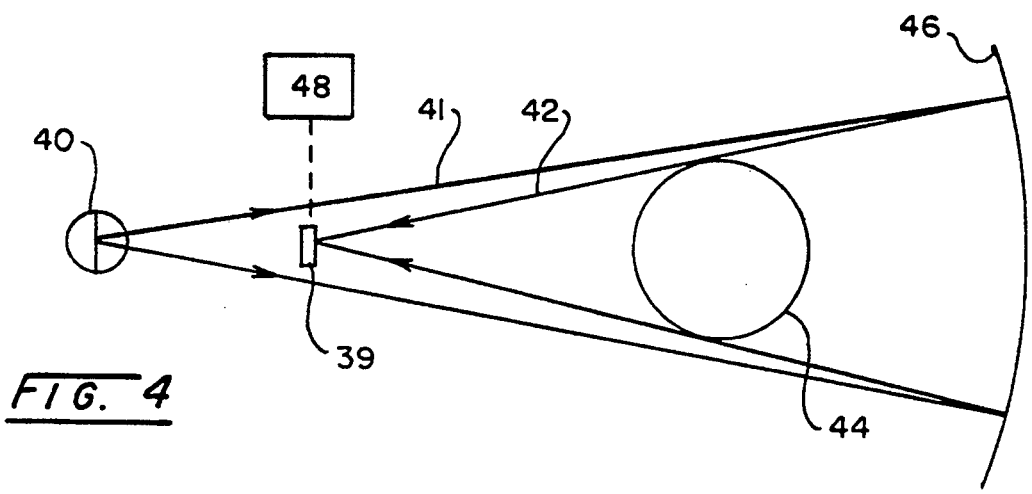
FIG. 4 is a schematic side view illustrating an alternative embodiment of the present invention.

It is preferred, as shown in FIG. 2, that the light source, which comprises the planar mirror 32, be positioned between the detector 36 and the workpiece 20. However, the positions of the detector 36 and rotating shaft 30 of FIG. 2 can be reversed as shown in FIG. 4. If the two elements are reversed in position, then the possibility of error arises. Since mirrors are subject to imperfections in their curvature, there is a potential for imperfect reflection of light from one focus to the other. That is, light coming from one focus may, after reflecting from an imperfect mirror, be directed to a position slightly offset from the second focus.

In the embodiment in which the shaft 30 and detector 36 have the preferred orientation, the laser beam 35 coming from the planar mirror 32 and just contacting the outer surface of the workpiece 20, next reflects from the elliptical mirror 28 back toward the detector 36. If the laser beam 35 is reflected imperfectly from the elliptical mirror 28, then it will not be incident upon the exact focus of the elliptical mirror 28, at which the detector 36 is located. In this case, the reflected beam 37 will be displaced from its ideal path, which is the path it would take with an ideal, perfect mirror. Since the beam 37 reflected from the mirror 28 is significantly spaced radially outward from the workpiece 20, a slight error in reflection due to imperfections in the elliptical mirror 28 will not cause any measurement error, the reflected beam 37 will only be displaced from its ideal path. This is solved by making the detector 36 larger in diameter than the laser beam 33. This large diameter detector 36 allows the reflected beam 37 to be displaced slightly while still being able to be detected. Since no lenses or mirrors are in the path of the laser beam 35 between the light source and the workpiece 20, no measurement error is introduced, only displacement of the reflected beam 37 to a different region of the detector 36 after passing by the workpiece 20.

In the embodiment shown in FIG. 4, where a detector 39 and rotating shaft 40 are reversed in position with respect to FIG. 2, a reflected laser beam 42 contacts the outer edge of a workpiece 44 after it reflects from an elliptical mirror 46. In this embodiment, the beam 41 incident upon the elliptical mirror 46 is displaced significantly, radially outward of the workpiece 44, and the beam 42 reflected from the elliptical mirror 46 is displaced radially inwardly of the incident beam 41.

The measurement of the workpiece 44 could be accurately determined if the elliptical mirror 46 were perfect. However, since imperfections exist in all mirrors, a slight deviation in the path followed by the reflected beam 42 toward the workpiece 44 may cause the reflected beam 42 to reflect off of, and effectively be blocked by, the workpiece 44. Fluctuation in the direction of the reflected beam 42 radially toward the workpiece 44 due to imperfections in the elliptical mirror 46, will cause the reflected beam 42 to be hidden by the workpiece 44 and interpreted as within the outer edges of the workpiece 44 by computer 48. In this case, the beam 42 would fail to be detected by the detector 39, regardless of the size of the detector 39. This gives an erroneous reading indicating that the outer edge of the workpiece 44 has been reached.

With the preferred embodiment, any fluctuation to the degree likely with typically imperfect mirrors will not result in measurement error. This is due to compensation for fluctuation by increasing the size of the detector 36 and the positioning of the detector 36 and rotating shaft 30. In the alternate embodiment of FIG. 4, fluctuation radially away from the workpiece 44 will not result in error, for the same reason as in the preferred embodiment. However, fluctuation of the reflected beam 42 radially toward the workpiece 44 can cause the reflected beam 42 to be hidden or partially blocked by the workpiece 44. Measurement error, which could not be compensated for by increasing the size of the detector 39 any amount, will result. Therefore, even though the alternative embodiment shown in FIG. 4 will work theoretically, in practice it will not be as accurate as the preferred embodiment shown in FIG. 2, due to the practical imperfections found in all mirrors.

It is preferred that the light source of the photometric gauge be a laser beam reflected by a planar mirror that is mounted on a rotating shaft. However, an equivalent light source would be a laser beam producing device attached directly to a rotating shaft. This apparatus would produce the same result as the preferred light source, but would currently be impractical.

A light source as defined here should include diffused or invisible light, as well as X-ray or other electromagnetic radiation beams of any wavelength. The beams can be directed onto a mirror in the way that the preferred laser beam is, or scanned by some other means considered equivalent. The beam needs only to be able to be directed onto a concentrated area in order to have the capability of scanning.

Figure 5:
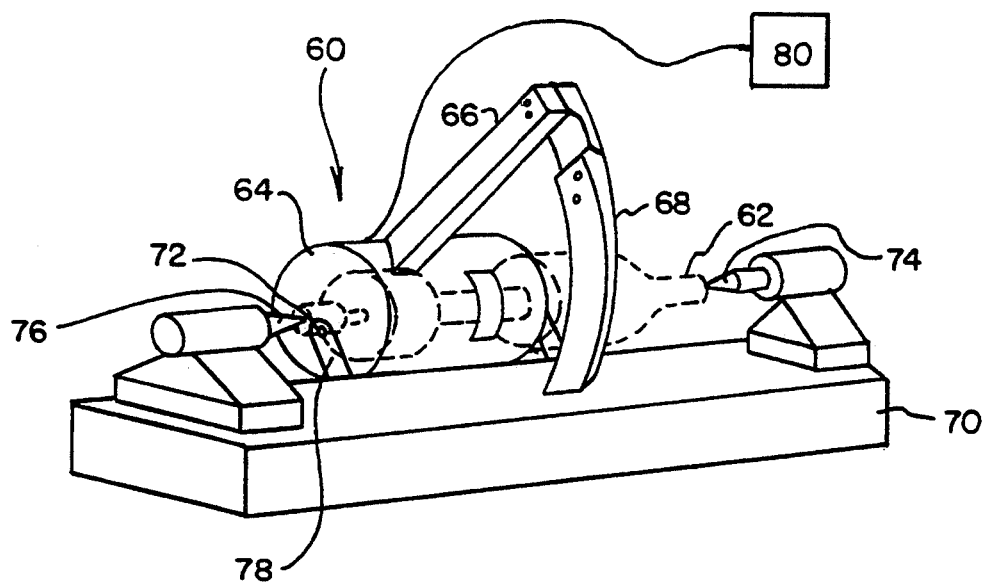
FIG. 5 is a view in perspective illustrating the mounting of the preferred embodiment of the present invention on a profiler.

An embodiment is illustrated in FIG. 5 in which a photometric gauge 60 is used to determine and plot the profile of a workpiece 62 shown in phantom. The photometric gauge 60 has a cylindrical housing 64 from which a bar 66 extends radially. An arcuate member 68 is attached to the bar 66 and houses an elliptical mirror as in the preferred embodiment. The housing 64 is pivotally attached to a carriage 78 by a pair of hinges 72, one of which is not visible in FIG. 5. The photometric gauge 60 pivots downwardly about the hinges 72 into the measuring position which is the position shown in FIG. 5.

It is preferred that the hinges 72 have their axes aligned coaxial with the axis of a light source of the photometric gauge 60. The light source of the photometric gauge 60 is preferably a rotatingly driven shaft with a planar mirror attached to it as in the preferred embodiment. If the axes of the hinges 72 are coaxial with the axis of the rotatingly driven shaft, pivoting of the photometric gauge 60 downwardly about the hinges 72 will not result in any change in distance between the axis of the workpiece 62 and the axis of the rotatingly driven shaft. By maintaining this distance, substantial accuracy is obtained.

A base 70 holds the workpiece 62 between a pair of non-driven centers 74 and 76 as are found at one end of a conventional lathe. The housing 64 is hingedly mounted to a driven carriage 78, which is slidably mounted to the base 70, slidable parallel to the axis of the workpiece 62.

Preferably, this apparatus is connected to a computer 80. The photometric gauge 60 is placed in the measuring position, and a large number of measurements are recorded as the photometric gauge 60 is displaced axially along the workpiece 62 by the driven carriage 78, not visible in FIG. 5. As the photometric gauge 60 is displaced axially and measurements of the diameter of the workpiece 62 are taken following the principles of the preferred embodiment, the axial positioning of the photometric gauge 60 with respect to the axial position of the workpiece 62 is recorded. The computer 80 then plots diameters versus axial position on a screen or paper printout.

Preferably, the photometric gauge 60 is driven at a constant velocity along the axis of the workpiece 62 and the computer 80 records diameter measurements at regular time intervals along the axis. The axial position of each measurement is determined from the time interval at which it was taken.

In the preferred embodiment of the present invention, as well as the embodiment illustrated in FIG. 5, the photometric gauge does not need to be calibrated with a bar having a known value whenever a significant variation in diameter of the measured workpiece 62 is to be encountered. The photometric gauge 60 illustrated in FIG. 5, which measures and produces a plot of a workpiece 62 having large variations in diameter, would not require calibrations at each new diameter. It is possible to calibrate the photometric gauge 60 at specific intervals, such as daily to ensure accuracy. However, it is not necessary to calibrate the device to prevent error introduced from variations in diameter.

Figure 6:
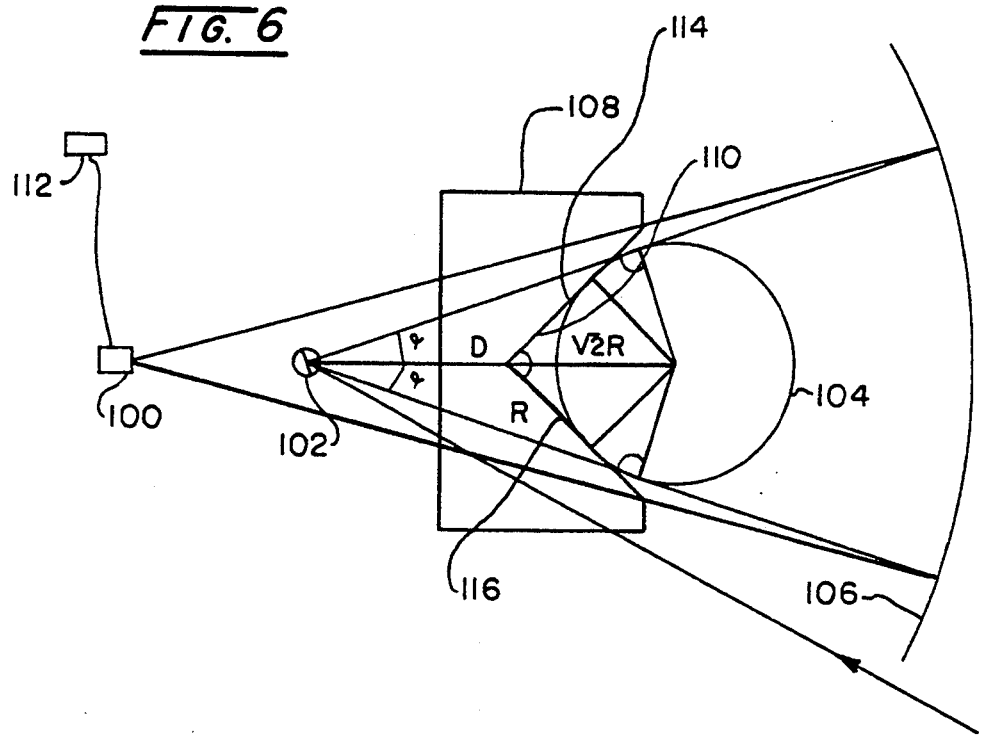
FIG. 6 is a schematic side view illustrating the preferred embodiment of the present invention in combination with a V-block.

A detector 100 and a light source 102 are located at the foci of an elliptical mirror 106, as illustrated in FIG. 6. A workpiece 104 is located between the light source 102 and the elliptical mirror 106, with all the elements in the preferred location as in the embodiment illustrated in FIG. 2.

In a situation in which the workpiece 104 has its axis at a position which is not always known, the distance from the axis of the workpiece 104 to the light source 102 must be determined. One instrument for measuring this distance uses a conventional V-block 108. The V-block 108 illustrated in FIG. 6 has a V-shaped groove 110 formed along one side. The sidewalls 114 and 116 of the groove 110 are contained within planes oriented at a 90° angle with respect to each other. The workpiece 104 is placed against both of the sidewalls 114 and 116 of the groove 110.

The distance between the light source 102 and the innermost depth of the groove 110 is a known value and is denoted as d in FIG. 6. The distance between the axis of the workpiece 104 and both sidewalls 114 and 116 of the groove 110 is equal to the radius, R of the workpiece 104. Additionally, the distance from the points of contact between the sidewalls 114 and 116 and the outer surface of the workpiece 104 to the lowest depth of the groove 110 also equals the radius, R. By geometry, it is known that the distance between the axis of the workpiece 104 and the lowest depth of the groove 110 is determined to be equal to $\sqrt{2}R$. A computer 112 connected to the detector 100 uses the equation $$R = d \frac{\sin\alpha}{1 - \sqrt{2}\sin\alpha}$$

to calculate the radius, R using the same method of calculating $\alpha$ as the preferred embodiment.

While certain preferred embodiments of the present invention have been disclosed in detail, it is to be understood that various modifications may be adopted without departing from the spirit of the invention or scope of the following claims.

I claim:

1. A photometric gauge for measuring radial dimensions of a workpiece, the gauge comprising:
   (a) a mirror having an approximately elliptical curvature and a pair of foci;
   (b) a coherent light source for scanning a beam radially across the workpiece, and a significant distance on either side of the workpiece, at a selected angular velocity, through only a fluidic medium, the light source located at one focus of the elliptical mirror and the workpiece located between the light source and the mirror;
   (c) a light responsive detector circuit including a photodetector located at the other focus of the mirror, for receiving light reflected form the elliptical mirror that has passed by both sides of the workpiece, and generating an electrical signal which is a function of the quantity of received light wherein the photodetector is between the light source and the workpiece; and
   (d) an electronic data processor connected to the detector circuit for calculating the radial dimension of the workpiece scanned by the beam from said angular velocity, the detected time interval during which the scanning beam is interrupted by the workpiece and the positioning dimension of the light source with respect to the workpiece.

2. A photometric gauge for measuring radial dimensions of a workpiece, the gauge comprising:
   (a) a mirror having an approximately elliptical curvature and a pair of foci;
   (b) a coherent light source for scanning a beam radially across the workpiece, and a significant distance on either side of the workpiece, at a selected angular velocity, through only a fluidic medium, the light source located at one focus of the elliptical mirror and the workpiece located between the light source and the mirror;
   (c) a light responsive detector circuit including a photodector located at the other focus of the mirror, for receiving light reflected from the elliptical mirror that has passed by both sides of the workpiece, and generating an electrical signal which is a function of the quantity of received light wherein the light source is between the photodetector and the workpiece; and
   (d) an electronic data processor connected to the detector circuit for calculating the radial dimension of the workpiece scanned by the beam from said angular velocity, the detected time interval during which the scanning beam is interrupted by the workpiece and the positioning dimension of the light source with respect to the workpiece.

3. A photometric gauge in accordance with claim 2 wherein the light source is an invisible light.

4. A photometric gauge in accordance with claim 2 wherein the light source is a laser.

5. A photometric gauge in accordance with claim 4 wherein the light source further comprises a planar mirror attached parallel to the axis of a rotatingly driven shaft and the laser is directed onto the rotating, planar mirror, causing the reflected beam to scan radially over the workpiece during a portion of the rotation of the planar mirror.

6. A photometric gauge in accordance with claim 5 wherein the workpiece is mounted to a base having a carriage slidably mounted to it which slides parallel to the axis of the workpiece, and the photometric gauge is mounted to the carriage.

7. A photometric gauge in accordance with claim 6 wherein the photometric gauge is pivotally mounted to the carriage for pivoting the photometric gauge into and out of the measuring position with respect to the workpiece, and for axially displacing the photometric gauge along the axis of the workpiece.

8. A photometric gauge in accordance with claim 7 wherein the base is a lathe and the elliptical mirror pivots from a back side of the workpiece, over and around to the opposite, front side of the workpiece, placing the mirror on the opposite side of the workpiece than the source and the detector circuit.

9. A photometric gauge in accordance with claim 8 wherein the photometric gauge moves along the axis of the workpiece to measure radial dimensions at a plurality of measured axial distances to produce a profile of the workpiece having measured radial dimensions at each measured axial position on the workpiece.

10. A photometric gauge in accordance with claim 8 wherein a first plane intersects the elliptical mirror perpendicular to the entire mirror surface, the detector circuit and source are positioned on opposite sides of the first plane, a second plane contains beams incident on the elliptical mirror, and a third plane contains beams reflected from the elliptical mirror, both the second and third planes forming the same angle with respect to the first plane.

11. A photometric gauge in accordance with claim 7 wherein the photometric gauge moves along the axis of the workpiece to measure radial dimensions at a plurality of measured axial distances to produce a profile of the workpiece having measured radial dimensions at each measured axial position on the workpiece.

12. A photometric gauge in accordance with claim 11 wherein the photometric gauge pivots about the axis of the rotating shaft on which the planar mirror is attached for maintaining the distance between the axis of the rotating shaft and the axis of the workpiece.

13. A photometric gauge in accordance with claim 12 wherein the workpiece engages a V-block that has a position that is known for determining the position of the axis of the workpiece.

* * * * *